March 10, 1942.  W. K. LEWIS  2,275,825

MANUFACTURE OF HYDROCHLORIC ACID

Filed Aug. 25, 1938

Inventor
WARREN K. LEWIS

Patented Mar. 10, 1942

2,275,825

UNITED STATES PATENT OFFICE 2,275,825

MANUFACTURE OF HYDROCHLORIC ACID

Warren K. Lewis, Newton, Mass., assignor to Eastman Kodak Company, Rochester, N. Y., a corporation of New Jersey Application August 25, 1938, Serial No. 226,753

8 Claims. (Cl. 23—121)

This invention relates to the manufacture of hydrochloric acid, and more particularly to a simplified and improved continuous low temperature method for obtaining hydrochloric acid from nitre cake, salt and sulfuric acid.

The usual methods for manufacturing hydrochloric acid employing salt and sulfuric acid are furnace operations at a relatively higher temperature than I propose using. Such processes consume considerable fuel and involve a number of corrosion and condensation difficulties.

That is, in an indirect heated furnace for hydrogen chloride manufacture, the heat would have to be transferred through furnace walls. Even with furnace wall construction of materials most favorable to heat transfer, considerable difficulty would be incurred. Usually because of corrosion conditions prevailing particularly at the high temperatures heretofore required, corrosion resisting materials are required. Such materials still further reduce the heat transfer efficiency.

It has also been proposed, in hydrochloric acid manufacture, to introduce flue gases directly into the materials being heated. While this gives a more direct heating, the resultant hydrogen chloride containing vapors, are hard to condense because of the non-condensable gases present.

I have found a low temperature method for the manufacture of hydrochloric acid, which method is relatively simple and efficient and obviates the aforementioned difficulties of heating and condensing. My method may be operated in a continuous manner and otherwise possesses a number of advantages.

This invention has for one object to provide a method for the manufacture of hydrochloric acid under temperature conditions considerably lower than temperatures heretofore used. Still another object is to provide a process for the manufacture of hydrochloric acid which may be carried out more or less under liquid phase-suspension conditions and at temperatures obtainable by steam. Still another object is to provide a process for the manufacture of hydrochloric acid which may be, if desired, operated in a continuous manner. Still another object is to provide a process for the manufacture of hydrochloric acid which may utilize various materials such as NaHSO₄, NaCl, H₂SO₄ and the like. A still further object is to provide a process of manufacturing hydrochloric acid wherein corrosion problems are minimized. A still further object is to provide a process for producing hydrochloric acid wherein aqueous acid of various strength, and a condensable product, may be obtained.

Still another object is to provide an apparatus particularly adapted for the continuous low temperature production of hydrochloric acid. A still further object is to provide apparatus for manufacturing hydrochloric acid which may be operated at relatively low temperatures. A still further object is to provide apparatus for manufacturing hydrochloric acid provided with means for continuous feed. Other objects will appear hereinafter.

I have found that hydrochloric acid may be manufactured from salt and nitre cake or sulfuric acid at a relatively low temperature and at temperatures which may be obtainable from superheated steam. I have found that it is desirable to conduct my process by eliminating air or other non-condensable gases from the reaction and handling the reactants preferably as liquids or flowable suspensions of solids in liquids, and gases.

For a more complete understanding of my invention, reference is made to the attached drawing forming a part of the present application.

Figure 1:
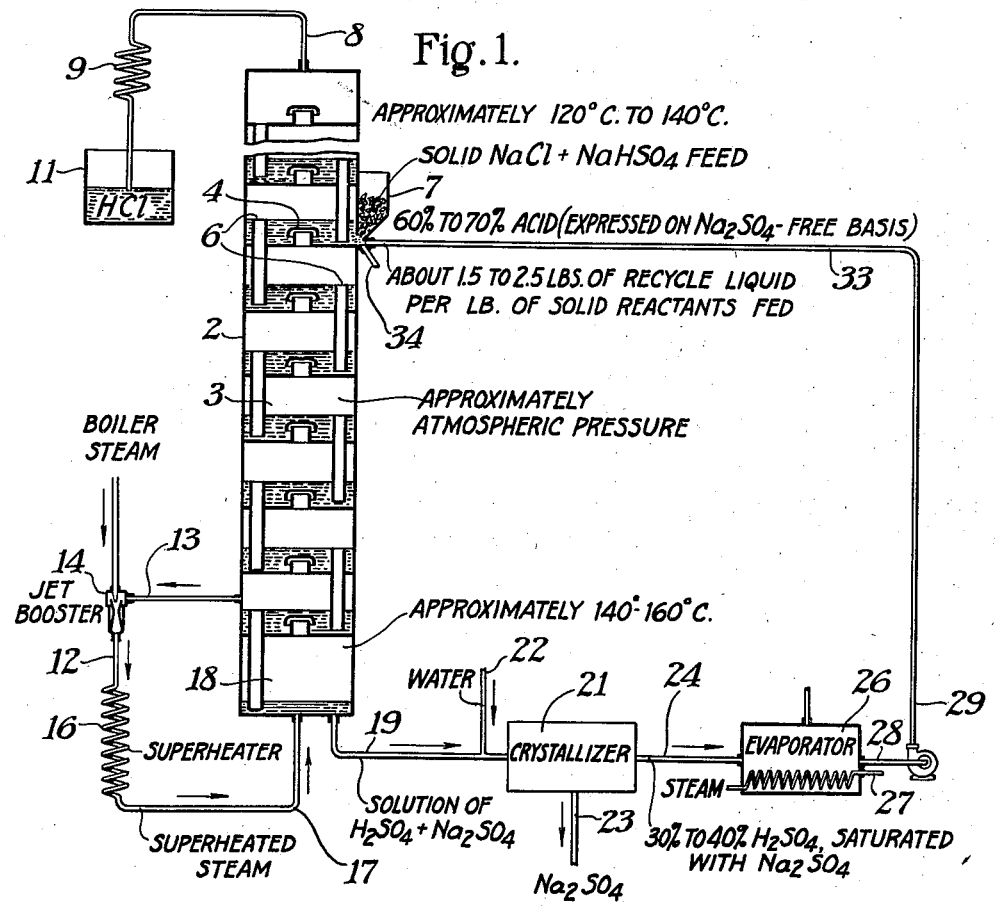
Fig. 1 is a semi-diagrammatic side elevation view in the nature of a flow sheet showing the arrangement of apparatus suitable for carrying out my process.

Referring to Fig. 1, 2 represents a bubble cap or other type gas and liquid-contact apparatus. The particular structure shown in Fig. 1 is a bubble cap tower made up of a plurality of sections 3, of more or less standard construction. That is, bubble caps are provided at 4 and overflow conduits at 6. The upper portion of the apparatus is equipped with at least one feed hopper 7, to be described in further detail hereinafter. The upper portion of the apparatus is also connected by the offtake conduit 8 to condenser 9, which in turn is connected to a receiver 11 for the hydrochloric acid.

The lower portion of the column is connected with a circulatory heating mechanism designated 12. This device is provided with a conduit 13 for withdrawing heating medium from an upper plate of the column to a jet booster 14, or other suitable mechanism for introducing further heating medium. The heating medium may be then fed through a super-heater 16 and from thence by conduit 17 to the lower section of the column 18.

The lower portion of the column is connected by conduit 19 to a crystallizing unit 21. Conduit 22 may be provided for introducing water or other liquid to the mixture, as the situation may require. The crystallizer may be an ordinary pan type. Or, a crystallizer adapted for continuous operation may be positioned at 21, the showing in Fig. 1 merely being diagrammatic. A draw-off would be provided at 23 for the removal of sodium sulfate from the system.

The crystallizer would be further connected by conduit 24 to an evaporator 26. This evaporator likewise may comprise a unit of usual construction supplied with a heating medium as at 27; hence, extended description thereof is unnecessary. The last unit of the series is connected by means of conduits 28 and 29 to the feed hopper 7, previously mentioned.

Figure 2:
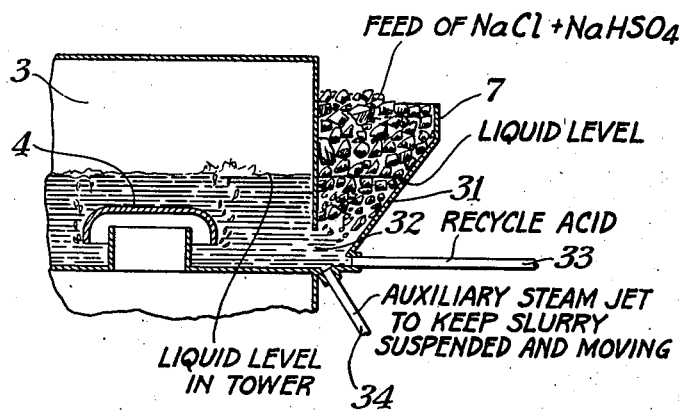
Fig. 2 is a diagrammatic side elevation view on exaggerated scale, of a detail of the apparatus shown in Fig. 1.

Referring now to Fig. 2, the preferred construction of my feeding mechanism will now be set forth. The parts 3 and 4 represent a plate section and bubble cap, respectively, as already described under Fig. 1. The hopper 7 may be comprised of a metal shell having the sloping sidewall and/or bottom 31 adapted for gravity discharge into the interior of the column. The hopper is connected with the plate section of the column by means of the opening 32. If desired, a bell-type valve (not shown), or other suitable construction adapted to open in one direction, may be interposed. A plurality of conduits 33 and 34 may be positioned for feeding into the bottom of the hopper construction in a variety of directions. By this arrangement recycled material may be introduced or steam may be introduced for maintaining the components contained in the hopper, in an agitated condition.

The operation of my apparatus as well as a further understanding of my process may be had from the following example, which is set forth for the purpose of illustrating my preferred embodiment. Therefore, the example is not to be construed as a limitation upon my invention.

Referring now to Fig. 1, as already indicated, the apparatus 2 which I prefer to use, comprises a plate tower in which effective countercurrent contact and contact of vapor and liquid may be obtained. While I have shown bubble cap constructions, it is also possible to use perforated plates, a packed column or some combination construction such as bubble cap plates and perforated plates. Into the upper portion of the apparatus as at 7, is introduced a slurry containing salt and sodium acid sulfate suspended in sulfuric acid. In the particular example, approximately equi-molal quantities of salt and sodium acid sulfate were suspended in a sulfuric acid of about 60% concentration. However, these quantities may be varied depending upon the final composition of the acid desired and other such factors. The sulfuric acid, if the process has been in operation in a continuous manner, has dissolved in it a certain amount of sodium sulfate, as will be apparent from the description hereinafter set forth.

This slurry flows into the column through the orifice 32 and flows down the column from plate to plate through the various overflow conduits designated 6. Into the bottom of the column through 17 flows a stream of super-heated steam which rises through the plates and by bubbling through the slurry, keeps the solids in suspension in the liquid. The heated reactants react to give hydrochloric gas, which, with uncondensed steam from the column, leaves the column through 8 and is condensed at 9.

In my novel process the steam not only furnishes the heating medium directly but sufficiently dilutes the hydrogen chloride gas to give a condensable product of the desired composition.

Under the conditions of operation specified in this example, the distillate collected at 11 would comprise aqueous hydrochloric acid of a strength, for example, between 15-25%. By positioning a number of rectification plates in the upper portion of the apparatus or by other procedure materials entrained in the acid, such as particles of salt, may be removed. Hydrochloric acid of considerably stronger than 25% and up to, for example 55%-60%, can be obtained, depending upon the number of plates in the tower, the effectiveness of the countercurrent action and other factors which may be controlled for producing aqueous hydrochloric acid of some particular predetermined composition.

Some of the salt and nitre cake entering the hopper at 7 dissolve in the liquid in which they are suspended. However, there is an excess of the solids provided. This excess should not be so large that the slurry will not flow reasonably freely. As the reaction takes place in the tower, one or more forms of acid sulfate begin to crystallize out of the liquid so that the slurry progressively transforms itself from a suspension of excess salts and acid sulfate to one of acid sulfate alone. By using a sufficiently superheated steam in the bottom of the column, as at 18, some evaporation of water occurs, resulting in a stronger solution, leaving the column through 19.

This solution removed through 19, comprising sulfuric acid and sodium sulfate, is preferably diluted to some extent as with water for obtaining a liquid comprising, for example, 30-40% acid. Out of such a liquid, sodium sulfate may be crystallized. For example, this crystallization may be conducted in a batch-wise manner by cooling the liquid until crystallization occurs. Or, the liquid may be fed through a continuous crystallizer, wherein a crystallization operation takes place more or less automatically.

The mother liquid from the crystallizing step is drawn off through conduit 24 and is preferably evaporated from the concentration, for example, 35-38% to 60-70% and thereafter recycled through conduits 28 and 29 to the feed hopper. The evaporator 26 may comprise conventional equipment; hence, extended description thereof is unnecessary.

This recycled liquid still carries a considerable amount of sodium sulfate in solution. For example, about 1.7 lb. of anhydrous sulfate may be present for each pound of sulfuric acid, assuming the constituents in these two forms rather than in the form of the acid sulfate. The solution might contain approximately 60% of these two constituents in the aforementioned ratio, the rest being substantially water. However, the exact composition of the recycled solution varies with the conditions of crystallization and evaporation already described. It is sufficient to point out that the recycled liquid may be considered as comprising sulfuric acid, sodium sulfate and sodium acid sulfate.

Generically, my novel low temperature process comprises countercurrently bubbling, or otherwise intimately contacting steam with reactants comprising salt, nitre cake and sulfuric acid. The reaction is preferably carried out in a continuous manner as described. The portions of the various constituents may be varied, depending on the desired composition of the acid to be produced. It is also apparent from the preceding that a number of changes may be made in my process and apparatus.

For example, while a bubble cap column has been disclosed, other type columns may be employed. As described, the reaction tower functions so that the reacting liquid flowing down it has solids suspended therein and the tower should be constructed accordingly. Thus, perforated plates may be employed and are advantageous in maintaining the suspension of the solids although they have limitations as to the narrow limits within which gas velocity should be held for smooth operation.

Furthermore, for best operations it is preferred that the solids be introduced into the tower by procedure which will insure the obtaining of satisfactory suspensions. My novel construction as shown in Fig. 2, where up-flow of the recycled liquid is employed to aid in suspending the solids contained in the hopper, is a particularly satisfactory arrangement. The action of the recycled liquid may be supplemented by a small amount of auxiliary steam under adequate pressure introduced through the jet 34. One or more of these jets may be provided, depending on the size of the hopper. The steam or other medium is preferably introduced in a direction so as to induce the desired movement in the components contained in the hopper, as well as assist in the suspension of the solids.

In my preferred construction the escape of vapors from the column into the feed hopper is prevented by means of a liquid seal as shown. However, as already indicated, various type valves may be employed.

The numerical figures set forth herein are illustrative of conditions which might be employed in the production of a 20-25% aqueous hydrochloric acid. For stronger acids, a somewhat stronger sulfuric acid concentration in the recycled sulfuric acid would be maintained. When employing such higher concentrations of sulfuric acid, it may become desirable to heat the equipment to a higher temperature. While this can be done by means of more highly superheating of the steam, it can be more easily accomplished by the arrangement which I have shown. That is, a portion of the steam from a lower point in the column, may be recycled through the superheater. This is advantageously achieved by means of a jet booster or injector or other similar construction operated by a high pressure external steam supply. Other heating procedure may be employed, for example, a portion of the recycled acid might be heated to a higher temperature than described and introduced into the column, thereby supplying some heat.

The consistency of the suspension flowing through the column may be increased or decreased by recycling more or less liquor to produce the desired thin suspension at all points in the column and throughout the operation.

My process possesses a number of advantages. Heating requirements are kept to a minimum inasmuch as the heating medium is introduced directly into the reaction mixture, thereby eliminating losses which would be present if the heating was through furnace walls. In my method of operation not only does the steam supply the heat, but it serves to give the desired dilution for producing hydrochloric acid of a predetermined composition. Furthermore, the product from my process is directly condensable with conventional cooling, without the application of pressure, refrigeration, or other expedient (unless producing acid condensate materially above 40%).

As already pointed out, the heat which it is necessary to supply to the reaction zone, enters the system from its external source at points at which the conditions are, at least relatively, not corrosive. That is, in the steam boiler and superheater zone, only steam is in contact with the heating surface. When heat is added to the recycled acid in the evaporator, as suggested above, at this point it is relatively non-corrosive because of its substantial freedom from hydrochloric acid. It also should be noted with respect to my process that there is introduced into the reaction zone other than fortuitously, no materials whatever undesired in the reaction proper or in the recycling acid.

From the preceding it is therefore apparent that my invention is susceptible of some modification. Hence, I do not wish to be restricted excepting insofar as is necessitated by the prior art and the spirit of the appended claims.

What I claim and desire to be secured by Letters Patent of the United States is:

1. A process for the manufacture of hydrochloric acid and crystalline sodium sulphate which comprises passing a slurry comprising water, sodium chloride, sodium acid sulphate, and sulphuric acid through a reaction zone, passing steam through said zone counter-current to said slurry, withdrawing aqueous hydrochloric acid vapor from said zone, withdrawing reacted slurry from said zone, cooling said reacted slurry whereby crystalline sodium sulphate is precipitated, and mother liquor remains, evaporating said mother liquor and recycling evaporated liquor to said reaction zone as make up in the preparation of more of said first mentioned slurry.

2. A process for the manufacture of hydrochloric acid and crystalline sodium sulphate which comprises passing a slurry comprising water, sodium chloride, sodium acid sulphate, and sulphuric acid through a reaction zone, passing steam through said zone and in intimate contact with said slurry, withdrawing aqueous hydrochloric acid vapor from said zone, withdrawing reacted slurry from said zone, cooling said reacted slurry whereby crystalline sodium sulphate is precipitated, and mother liquor remains, removing water from said mother liquor and recycling this liquor to said reaction zone as make up in the preparation of more of said first mentioned slurry.

3. A process for the manufacture of hydrochloric acid and crystalline sodium sulphate which comprises preparing a feed slurry comprising water, sodium chloride, sodium acid sulphate, and sulphuric acid, injecting a fluid into the feed slurry for facilitating the flow thereof, feeding the fluid slurry through a reaction zone, passing steam through said zone in contact with slurry, withdrawing aqueous hydrochloric acid vapor from said zone, withdrawing slurry from said zone, cooling said withdrawn slurry whereby crystalline sodium sulphate is precipitated, and mother liquor remains, concentrating said mother liquor and recycling concentrated liquor to the first mentioned steps as make up in the preparation of more of said first mentioned slurry.

4. A process for the manufacture of hydrochloric acid and crystalline sodium sulphate which comprises passing a slurry comprising water, sodium chloride, sodium acid sulphate, and sulphuric acid through a reaction zone, passing steam through said zone counter-current to said slurry, withdrawing and rectifying the aqueous hydrochloric acid vapor produced by the foregoing reaction, withdrawing reacted slurry from said zone, cooling said withdrawn slurry whereby crystalline sodium sulphate is precipitated, and mother liquor remains, evaporating said mother liquor and recycling evaporated liquor to said reaction zone as make up in the preparation of more of said first mentioned slurry.

5. A process for the manufacture of hydrochloric acid and crystalline sodium sulphate which comprises passing a slurry comprising water, sodium chloride, sodium acid sulphate, and sulphuric acid, having the ratio of about 1 lb. of solids to 1.8 lb. of a liquid medium comprising 30%–80% sulphuric acid containing liquid, expressed on a sodium sulphate free basis, through a reaction zone, passing steam through said zone and in contact with said slurry, reacting the materials in the reaction zone at a temperature between 120° C.–160° C., withdrawing aqueous hydrochloric acid vapor from said zone, withdrawing reacted slurry from said zone, cooling said reacted slurry, concentrating the liquid from the cooling step and recycling concentrated liquid to said reaction zone as make up in the preparation of more of said first mentioned slurry.

6. In a process for the manufacture of hydrochloric acid by procedure including the steps of passing a slurry comprised of water, sodium chloride, sodium acid sulphate, and sulphuric acid through a reaction zone in contact with steam, the step which comprises withdrawing steam intermediate of the reaction zone, raising the temperature of the steam and re-introducing the steam into the reaction zone.

7. In a process for the manufacture of hydrochloric acid by procedure including the steps of passing a slurry comprised of water, a metal chloride, an acid sulphate, and sulphuric acid through a reaction zone in contact with steam, a step which comprises withdrawing the steam from one point in the reaction zone, mixing the withdrawn steam with steam at higher temperature, superheating the resultant mixture and returning the superheated materials to the reaction zone.

8. In a process for the manufacture of hydrochloric acid by reacting sodium chloride, sodium acid sulfate, sulfuric acid and steam, wherein residual materials containing sulfuric acid liquid and sodium sulfate are obtained, the steps of rendering at least some of the residual constituent re-utilizable, comprising crystallizing part of the sodium sulfate from the sulfuric acid liquid and subjecting the sulfuric acid liquid to an evaporation treatment by heating the acid liquid for volatilizing off water to produce sodium acid sulfate therein for use in the aforementioned reaction.

WARREN K. LEWIS.